(12) United States Patent
Godbole

(10) Patent No.: US 11,313,610 B2
(45) Date of Patent: Apr. 26, 2022

(54) SYSTEMS AND METHODS FOR A VACUUM INSULATED PANEL

(71) Applicant: The Coca-Cola Company, Atlanta, GA (US)

(72) Inventor: Vinayak S. Godbole, Peachtree City, GA (US)

(73) Assignee: The Coca-Cola Company, Atlanta, GA (US)

( * ) Notice: Subject to any disclaimer, the term of this patent is extended or adjusted under 35 U.S.C. 154(b) by 738 days.

(21) Appl. No.: 15/704,612

(22) Filed: Sep. 14, 2017

(65) Prior Publication Data

US 2018/0003427 A1  Jan. 4, 2018

Related U.S. Application Data

(62) Division of application No. 14/299,765, filed on Jun. 9, 2014, now abandoned.

(60) Provisional application No. 61/919,946, filed on Dec. 23, 2013, provisional application No. 61/833,160, (Continued)

(51) Int. Cl.
*F25D 23/02* (2006.01)
*A47F 3/04* (2006.01)
*F16L 59/065* (2006.01)

(52) U.S. Cl.
CPC .............. *F25D 23/02* (2013.01); *A47F 3/043* (2013.01); *A47F 3/0434* (2013.01); *F16L 59/065* (2013.01); *F25D 2201/14* (2013.01); *Y10T 29/49826* (2015.01); *Y10T 137/86083* (2015.04)

(58) Field of Classification Search
CPC .... F25D 23/02; F25D 2201/14; A47F 3/0434; A47F 3/043; Y10T 137/86083; Y10T 29/49826; F16L 59/065
See application file for complete search history.

(56) References Cited

U.S. PATENT DOCUMENTS

| 3,307,373 | A | | 10/1967 | Booth | |
|---|---|---|---|---|---|
| 3,842,567 | A | * | 10/1974 | Zwart | E06B 3/677 53/403 |
| 5,252,408 | A | | 10/1993 | Bridges et al. | |

(Continued)

FOREIGN PATENT DOCUMENTS

| CN | 2409314 A | 12/2000 | |
|---|---|---|---|
| CN | 102701575 A | 10/2012 | |
| WO | WO-2013139281 A1 * | 9/2013 | ........... E06B 3/6612 |

OTHER PUBLICATIONS

International Search Report for International Application No. PCT/US2014/041495, dated Nov. 27, 2014.

*Primary Examiner* — Nathan L Van Sell
(74) *Attorney, Agent, or Firm* — Eversheds Sutherland (US) LLP

(57) ABSTRACT

A vacuum insulated panel is disclosed herein. According to an embodiment, the vacuum insulated panel may include a frame having a first side and a second side. The vacuum insulated panel also may include a first convex sheet positioned about the first side of the frame and a second convex sheet positioned about the second side of the frame. Moreover, the vacuum insulated panel may include a cavity formed between the first convex sheet and the second convex sheet. Further, the vacuum insulated panel may include a vacuum formed within the cavity. The vacuum may be configured to at least partially flatten the first convex sheet and the second convex sheet into a substantially parallel planar configuration.

11 Claims, 14 Drawing Sheets

Related U.S. Application Data filed on Jun. 10, 2013, provisional application No. 61/833,158, filed on Jun. 10, 2013.

(56) References Cited

U.S. PATENT DOCUMENTS

| | | |
|---|---|---|
| 2002/0187299 A1 | 12/2002 | Jousse et al. |
| 2006/0265979 A1 | 11/2006 | Cording |
| 2008/0118678 A1 | 5/2008 | Huang et al. |
| 2012/0315409 A1 | 12/2012 | Jones |
| 2015/0024151 A1* | 1/2015 | Dai .................. E06B 3/6612 428/34 |

* cited by examiner

SYSTEMS AND METHODS FOR A VACUUM INSULATED PANEL

CROSS-REFERENCE TO RELATED APPLICATIONS

The disclosure is a divisional application of U.S. application Ser. No. 14/299,765, filed Jun. 9, 2014, which claims priority to and the benefit of U.S. Provisional Application No. 61/833,160, filed Jun. 10, 2013, U.S. Provisional Application No. 61/833,158, filed Jun. 10, 2013, and U.S. Provisional Application No. 61/919,946, filed Dec. 23, 2013, which are all hereby incorporated by reference in their entirety.

FIELD

The disclosure generally relates to a vacuum insulated panel and more particularly relates to a vacuum insulated panel including one or more convex sheets configured to be flattened when a vacuum is applied thereto. The disclosure also generally relates to a cooler assembly and more particularly relates to a cooler assembly including a screen.

BACKGROUND

Typical vacuum insulated panels may include a frame configured to support two opposing sheets. For example, two glass sheets of relatively the same size and the same shape may be spaced apart from each other by the frame. The frame and the opposing glass sheets may collectively form an air tight cavity within the interstitial space between the opposing glass sheets. In order to increase the thermal properties of the vacuum insulated glass panel, a vacuum may be created between the opposing glass sheets. The vacuum between the opposing glass sheets, however, may tend to draw the opposing glass sheets inward towards each other in a biconcave manner. In order to prevent the opposing glass sheets from collapsing in on the cavity and/or touching, one or more spacers may be positioned between the opposing glass sheets within the cavity. The spacers, however, may create pathways for heat to travel between the opposing glass sheets, thereby reducing the overall thermal properties of the vacuum insulated glass panel.

A typical cooler assembly may include a transparent door that enables consumers to view the contents of the cooler assembly when the door is closed. The door generally may have higher thermal conductivity as compared to other portions of the cooler assembly. In this manner, the majority of heat transfer between the cooler assembly and the surrounding environment may occur at the door, even when the door is closed. The more heat transfer that occurs at the door, the more energy that is required to maintain the cooler assembly at a desired temperature.

Cooler assemblies typically operate all day long. That is, a typical cooler assembly may be powered on for 24 hours a day. Many stores, however, may only be open for a portion of the day, such as 8-12 hours. Nevertheless, it may not be feasible to power down the cooler assembly when the store is closed because many products required constant refrigeration. When the store is closed, heat transfer through the door may be particularly inefficient as no customers are present.

SUMMARY

Some or all of the above needs and/or problems may be addressed by certain embodiments of the vacuum insulated panel disclosed herein. According to an embodiment, the vacuum insulated panel may include a frame having a first side and a second side. The vacuum insulated panel also may include a first convex sheet positioned about the first side of the frame and a second convex sheet positioned about the second side of the frame. Moreover, the vacuum insulated panel may include a cavity formed between the first convex sheet and the second convex sheet. Further, the vacuum insulated panel may include a vacuum formed within the cavity. The vacuum may be configured to at least partially flatten the first convex sheet and the second convex sheet into a substantially parallel planar configuration.

BRIEF DESCRIPTION OF THE DRAWINGS

The detailed description is set forth with reference to the accompanying drawings, which are not necessarily drawn to scale. The use of the same reference numerals may indicate similar or identical items. Various embodiments may utilize elements and/or components other than those illustrated in the drawings, and some elements and/or components may not be present in various embodiments. Throughout this disclosure, depending on the context, singular and plural terminology may be used interchangeably.

DETAILED DESCRIPTION

Figure 1:
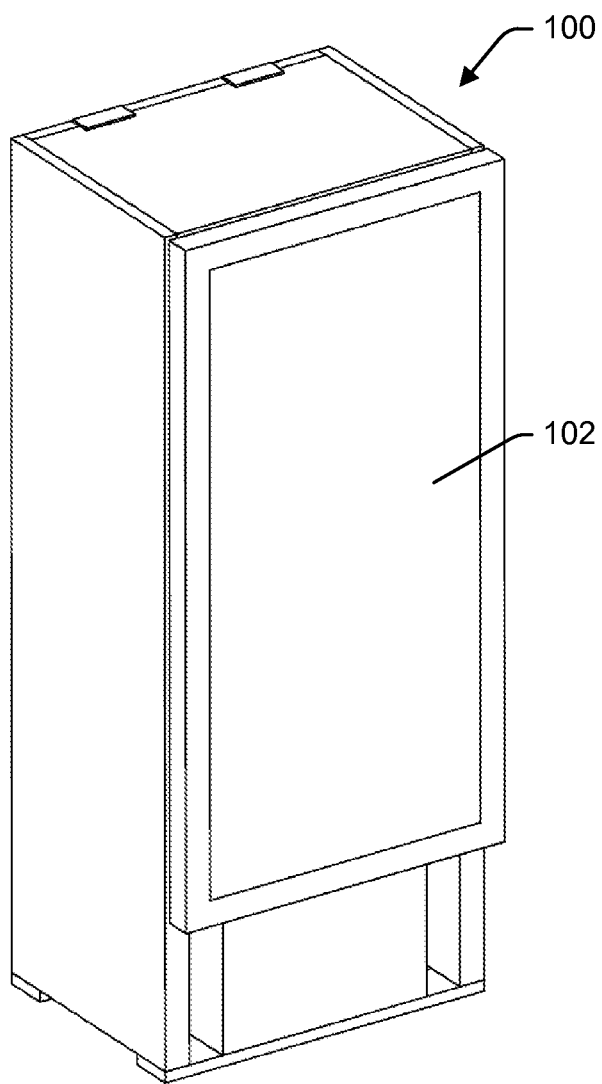
FIG. 1 schematically depicts a perspective view of a cooler assembly in accordance with one or more embodiments of the disclosure.

A vacuum insulated panel is disclosed herein. In some instances, the vacuum insulated panel may form the door of a cooler assembly, such as a beverage cooler in a retail setting or the like. Other types of coolers and/or items may be used herein, including perishable items, products, promotional items, or the like. Any item where a temperature controlled setting is desirable may be stored within the cooler. Moreover, the vacuum insulated panel may form other portions of the cooler assembly, such as a side panel, a rear panel, a top panel, and/or a bottom panel, etc. The vacuum insulated panel may be configured to provide a heat transfer barrier and/or obstruction between two or more spaces. For example, the vacuum insulated panel may be configured to prevent and/or substantially reduce the heat transfer between the interior of the beverage cooler and the surrounding environment.

In certain embodiments, the vacuum insulated panel may include one or more convex sheets configured to be flattened into a parallel planar configuration when a vacuum is applied thereto. The vacuum insulated panel may provide a number of technical advantages. For example, the vacuum insulated panel may be assembled without the use of spacers (or with a reduced number of spacers) disposed between the convex sheets. The absence or reduction in the use of spacers may eliminate and/or reduce the number of pathways for heat to travel between the convex sheets. By eliminating and/or reducing the number pathways for heat to travel between the convex sheets, the overall thermal properties of the vacuum insulated panel may be increased. Other technical advantages may become apparent throughout the disclosure.

According to an embodiment, the vacuum insulated panel may include a frame having a first side and a second side. The vacuum insulated panel also may include a first convex sheet positioned about the first side of the frame and a second convex sheet positioned about the second side of the frame. In this manner, the first convex sheet may oppose the second convex sheet. The frame may be any suitable material and/or configuration for the attachment of the first convex sheet and the second convex sheet thereto. The first convex sheet and the second convex sheet may be spaced apart from each other by the frame. In some instances, the first convex sheet and the second convex sheet may be substantially the same size and the same shape. In certain embodiments, the frame, the first convex sheet, and the second convex sheet may initially form a generally biconvex silhouette when assembled. In other instances, the vacuum insulated panel may include a single convex sheet. For example, one of the sheets may be convex and the other sheet may be planar, thereby initially forming a generally plano-convex silhouette when assembled.

In certain embodiments, the vacuum insulated panel may include a cavity formed between the first convex sheet and the second convex sheet. In some instances, the frame, the first convex sheet, and the second convex sheet may collectively form a hermetic seal about the cavity. For example, the frame, the first convex sheet, and the second convex sheet may be interconnected by one or more seals, joints, or combinations thereof so as to create an air tight cavity therebetween. In this manner, the vacuum insulated panel may include a vacuum formed within the air tight cavity. The vacuum may be configured to at least partially flatten the first convex sheet and the second convex sheet into a substantially parallel planar configuration.

In certain embodiments, the first convex sheet and the second convex sheet may be pre-formed. That is, the first convex sheet and the second convex sheet may include a predetermined or prefabricated arch or curve. In this manner, the first convex sheet and the second convex sheet may initially include a generally arcuate shape before the vacuum is applied thereto. The curvature of the first convex sheet and the second convex sheet may vary depending on a number of parameters. By way of example, the parameters for determining the curvature of the first convex sheet and the second convex sheet may include the strength of the material used to construct the sheets and/or frame, the overall size of the vacuum insulated panel, the size of the cavity, the strength of the vacuum, and/or the strength of the seals and/or joints formed between the frame and sheets, etc. Any number of parameters may be taken into account to determine the curvature of the first convex sheet and the second convex sheet.

In some instances, the first convex sheet may be a glass sheet, a plastic sheet, or a combination thereof. Similarly, the second convex sheet may be a glass sheet, a plastic sheet, or a combination thereof. For example, as noted above, the vacuum insulated panel may form the door of a cooler, such as a beverage cooler in a retail setting. In this manner, the vacuum insulated panel may be at least partially transparent so that a customer can see the contents of the cooler when the door is closed. Other types of materials or combinations of materials may also be used.

In certain embodiments, the vacuum insulated panel may include at least one access port. In some instances, the access port may be associated with the frame, the first convex sheet, the second convex sheet, or a combination thereof. The access port may be configured to provide access to the cavity. For example, a pump or the like may be in communication with the access port so as to create the vacuum within the cavity. Once the vacuum has been created within the cavity, the pump may be removed from the access port and the access port may be temporarily or permanently sealed closed.

These and other embodiments of the disclosure will be described in more detail through reference to the accompanying drawings in the detailed description that follows. This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Figure 2:
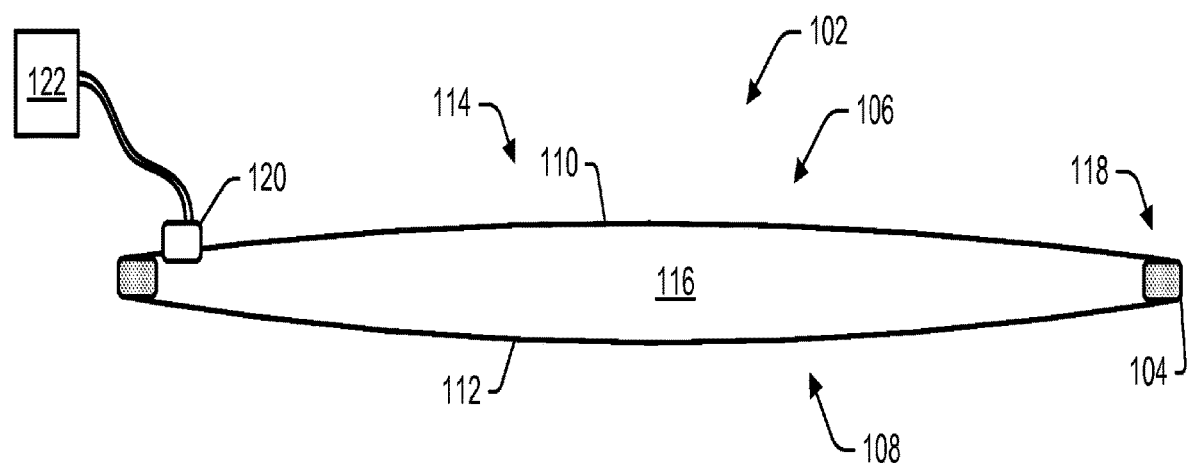
FIG. 2 schematically depicts a cross sectional view of a vacuum insulated panel in accordance with one or more embodiments of the disclosure.
Figure 3:
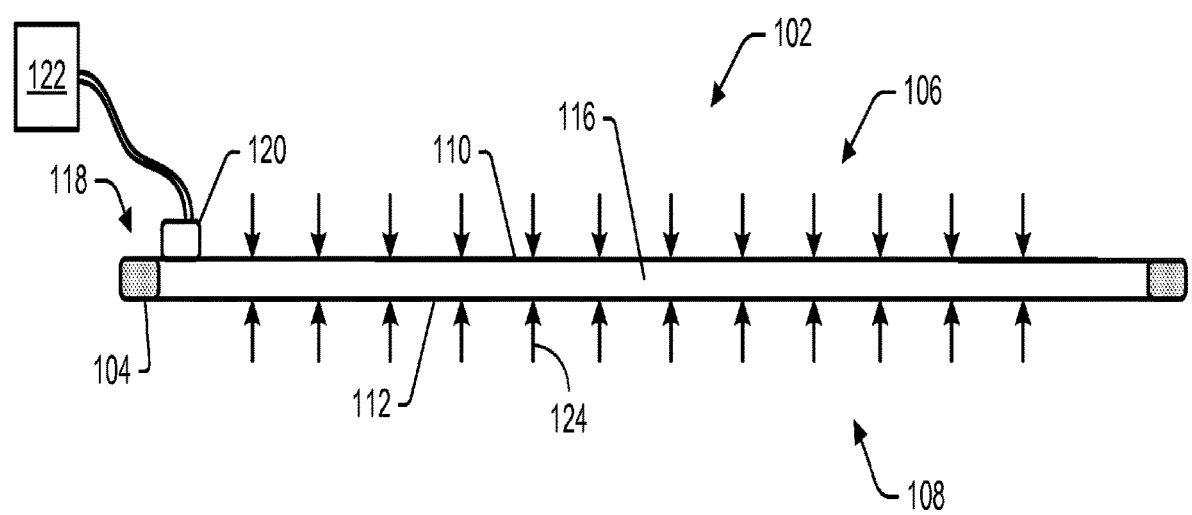
FIG. 3 schematically depicts a cross sectional view of a vacuum insulated panel in accordance with one or more embodiments of the disclosure.

FIGS. 1-3 schematically depict one or more example systems and methods for a vacuum insulated panel including one or more convex sheets configured to be flattened into a parallel planar configuration when a vacuum is applied thereto in accordance with one or more embodiments of the disclosure. Specifically, FIG. 1 schematically depicts an example embodiment of a cooler assembly 100 as may be used herein. In some instances, the cooler assembly 100 may be a beverage cooler located in a retail setting, such as a convenience store, a grocery store, or the like. Other types of cooler assemblies may also be used herein, including a table top cooler assembly, a walk-in cooler assembly, a free standing cooler assembly, an integral cooler assembly, a modular cooler assembly, or the like. Moreover, other types of items may be stored within the cooler assembly 100, including perishable items, products, promotional items, or the like. Any item where a temperature controlled setting is desirable may be stored within the cooler assembly 100. In addition, heating elements may be used herein. That is, the cooler assembly 100 may heat and/or cool items therein.

The cooler assembly 100 may include a vacuum insulated panel 102. In some instances, the vacuum insulated panel 102 may form a door for accessing the contents of the cooler assembly 100. In this manner, the vacuum insulated panel 102 may be configured to be opened and closed. For example, the vacuum insulated panel 102 may be a hinged door or a sliding door, although other types and styles of doors may be used herein. In some instances, the vacuum insulated panel 102 may include a handle or the like. A customer may open the vacuum insulated panel 102 and remove the contents within the cooler assembly 100, after which the user may close the vacuum insulated panel 102. In some instances, the vacuum insulated panel 102 may form other portions of the cooler assembly 100, such as a side panel, a rear panel, a top panel, and/or a bottom panel, etc. The vacuum insulated panel 102 may be configured to provide a heat transfer barrier and/or obstruction between two or more spaces. For example, the vacuum insulated panel 102 may be configured to prevent and/or substantially reduce the heat transfer between the interior of the cooler assembly 100 and the surrounding environment.

FIG. 2 schematically depicts an example embodiment of the vacuum insulated panel 102 before a vacuum is applied thereto. The vacuum insulated panel 102 may include a frame 104 having a first side 106 and a second side 108. The vacuum insulated panel 102 also may include a first convex sheet 110 and a second convex sheet 112. In some instances, the frame 104 may be aluminum, plastic, sheet metal, a combination thereof, or the like. The frame 104 may be any suitable material. The first convex sheet 110 and the second convex sheet 112 may be a glass sheet, a plastic sheet, a combination thereof, or the like. The first convex sheet 110 and the second convex sheet 112 may be any suitable material. As noted above, in some instances, the vacuum insulated panel 102 may form the door of the cooler assembly 100. In this manner, the vacuum insulated panel 102 may be at least partially transparent so that a customer can see the contents of the cooler assembly 100 when the door is closed.

In certain embodiments, the first convex sheet 110 may be positioned about the first side 106 of the frame 104, and the second convex sheet 112 may be positioned about the second side 108 of the frame 104. In this manner, the first convex sheet 110 may oppose (or face) the second convex sheet 112. The frame 104 may be any suitable material and/or configuration for the attachment of the first convex sheet 110 and the second convex sheet 112 thereto. In some instances, the frame 104 may extend about the periphery of the first convex sheet 110 and the second convex sheet 112. The first convex sheet 110 and the second convex sheet 112 may be spaced apart from each other by the frame 104. In some instances, the first convex sheet 110 and the second convex 112 sheet may be substantially the same size and the same shape. The nature of the curvature of the first convex sheet 110 and the second convex 112 sheet may vary. In certain embodiments, the frame 104, the first convex sheet 110, and the second convex sheet 112 may initially form a generally biconvex silhouette 114 when assembled, as depicted in FIG. 2.

In certain embodiments, the vacuum insulated panel 102 may include a cavity 116 formed between the first convex sheet 110 and the second convex sheet 112. In some instances, the frame 104, the first convex sheet 110, and the second convex sheet 112 may collectively form a hermetic seal about the cavity 116. For example, the frame 104, the first convex sheet 110, and the second convex sheet 112 may be interconnected by one or more joints 118. The joints 118 may include seals or the like for creating an air tight seal about the cavity 116.

In certain embodiments, the first convex sheet 110 and the second convex sheet 112 may be pre-formed. That is, the first convex sheet 110 and the second convex sheet 112 may include a predetermined or prefabricated arch or curve. In this manner, as depicted in FIG. 2, the first convex sheet 110 and the second convex sheet 112 may initially include a generally arcuate shape before a vacuum is applied to the cavity 116. The curvature of the first convex sheet 110 and the second convex sheet 112 may vary depending on a number of parameters. By way of example, the parameters for determining the curvature of the first convex sheet 110 and the second convex sheet 112 may include the strength of the material used to construct the first convex sheet 110 and the second convex sheet 112 and/or the frame 104, the overall size of the vacuum insulated panel 102, the size of the cavity 116, the strength of the vacuum applied to the cavity 116, and/or the strength of the joints 118 and seals formed between the frame 104 and the first convex sheet 110 and the second convex sheet 112, etc. Any number of parameters may be taken into account to determine the initial curvature of the first convex sheet 110 and the second convex sheet 112. Similarly, any number of parameters may be taken into account to determine the strength of the vacuum applied to the cavity 116.

In certain embodiments, the vacuum insulated panel 102 may include at least one access port 120. In some instances, the access port may be associated with the frame 104, the first convex sheet 110, the second convex sheet 112, or a combination thereof. The access port 120 may be configured to provide access to the cavity 116. In some instances, the access port 120 may be a valve, such as a one-way valve or the like. In some instances, a pump 122 or the like may be in communication with the access port 120.

FIG. 3 schematically depicts an example embodiment of the vacuum insulated panel 102 after a vacuum is applied thereto. The vacuum insulated panel 102 may include a vacuum formed within the air tight cavity 116. For example, the pump 122 may be in communication with the access port 120 so as to create the vacuum within the cavity 116. The vacuum may be configured to at least partially flatten the first convex sheet 110 and the second convex sheet 112 into a substantially parallel planar configuration. For example, the vacuum created within the cavity 116 may tend to draw the first convex sheet 110 and the second convex sheet 112 inward towards each other as indicated by arrows 124. That is, as air is drawn out of the cavity 116 by the pump 124, the first convex sheet 110 and the second convex sheet 112 may move inward towards each other. Once the vacuum has been created within the cavity 116, the pump 122 may be removed from the access port 120, and the access port 120 may be temporarily or permanently sealed closed.

In some instances, the vacuum insulated panel 102 may be assembled without the use of spacers. In other instances, the number of spacers disposed between the first convex sheet 110 and the second convex sheet 112 may be substantially reduced. Any number of spacers may be used herein. For example, in an embodiment, a single spacer may be positioned about a center portion of the first convex sheet 110 and the second convex sheet 112. In other instances, the spacers may be omitted. As noted above, the absence or reduction in the use of spacers may eliminate and/or reduce the number of pathways for heat to travel between the first convex sheet 110 and the second convex sheet 112. By eliminating and/or reducing the number pathways for heat to travel between the first convex sheet 110 and the second convex sheet 112, the overall thermal properties of the vacuum insulated panel 102 may be increased.

Figure 4:
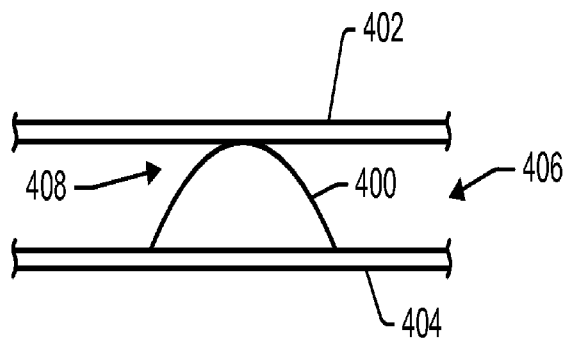
FIG. 4 schematically depicts a cross sectional view of a spacer in accordance with one or more embodiments of the disclosure.

FIG. 4 schematically depicts a cross sectional view of a spacer 400 in accordance with one or more embodiments of the disclosure. In some instances, the spacer 400 may include a number of spacers. The spacer 400 may be positioned between a first sheet 402 and a second sheet 404. The first sheet 402 and the second sheet 404 may oppose (or face) each other so as to form a cavity 406 therebetween. The first sheet 402 and/or the second sheet 404 may initially be convex or substantially flat. The spacer 400 may be disposed within the cavity 406 formed between the two opposing sheets. The spacer 400 may be disposed at any location within the cavity 406. In some instances, the spacer 400 may include at least one rounded side 408 configured to minimize the contact point between the first sheet 402. For example, if a vacuum is applied to the cavity 406, the surface area in contact between the first sheet 402 and the rounded tip 408 of the spacer 400 may be less than that of a non-rounded spacer. The rounded configuration of the spacer 400 may provide a robust spacer while minimizing the contact are between the spacer 400 and the first sheet 402. In this manner, the pathway created by the spacer 400 for heat to travel between the first sheet 402 and the second sheet 404 may be minimized.

Figure 5:
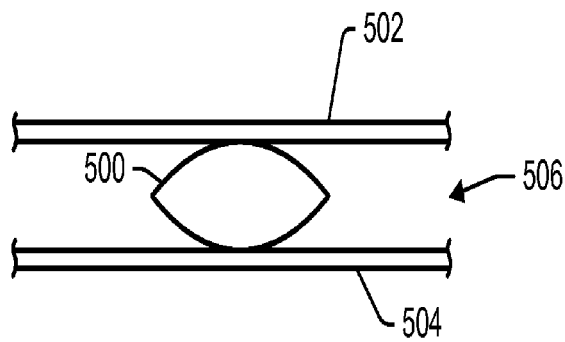
FIG. 5 schematically depicts a cross sectional view of a spacer in accordance with one or more embodiments of the disclosure.

FIG. 5 schematically depicts a cross sectional view of a spacer 500 in accordance with one or more embodiments of the disclosure. In some instances, the spacer 500 may include a number of spacers. The spacer 500 may be positioned between a first sheet 502 and a second sheet 504. The first sheet 502 and the second sheet 504 may oppose (or face) each other so as to form a cavity 506 therebetween. The first sheet 502 and/or the second sheet 504 may initially be convex or substantially flat. The spacer 500 may be disposed within the cavity 506 formed between the two opposing sheets. The spacer 500 may be disposed at any location within the cavity 506. In some instances, the spacer 500 may be rounded on both sides. For example, if a vacuum is applied to the cavity 506, the rounded surface area in contact between the first sheet 402 and the second sheet 504 may be less than that of a non-rounded spacer. The rounded configuration of the spacer 500 provides a robust spacer while minimizing contact between the spacer 500 and the first sheet 502 and the second sheet 504. In this manner, the pathway created by the spacer 400 for heat to travel between the first sheet 502 and the second sheet 504 may be minimized.

Figure 6:
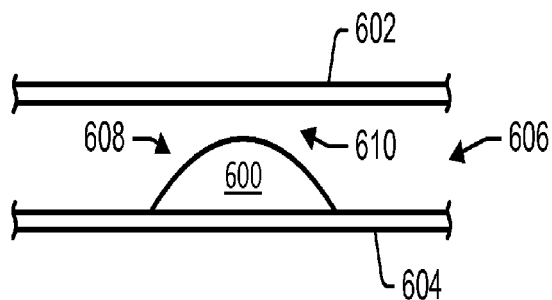
FIG. 6 schematically depicts a cross sectional view of a spacer in accordance with one or more embodiments of the disclosure.

FIG. 6 schematically depicts a cross sectional view of a spacer 600 in accordance with one or more embodiments of the disclosure. In some instances, the spacer 600 may include a number of spacers. The spacer 600 may be positioned between a first sheet 602 and a second sheet 604. The first sheet 602 and the second sheet 604 may oppose (or face) each other so as to form a cavity 606 therebetween. The first sheet 602 and/or the second sheet 604 may initially be convex or substantially flat. The spacer 600 may be disposed within the cavity 606 formed between the two opposing sheets. The spacer 600 may be disposed at any location within the cavity 606. In some instances, the spacer 600 may include at least one rounded side 608 configured to minimize the contact point between the first sheet 602. In addition, the spacer 600 may include a gap 610 between the rounded side 608 of the spacer 600 and the first sheet 602. In certain embodiments, if a vacuum is applied to the cavity 606, the gap 610 between the rounded side 608 of the spacer 600 and the first sheet 602 may be closed, and the rounded side 608 of the spacer 600 may contact the first sheet 602. In this manner, the first sheet 602 may tend to move in a direction away from the rounded side 608 of the spacer 600 so as to form the gap 610 therebetween if a vacuum is not applied to the cavity 606.

Figure 7:
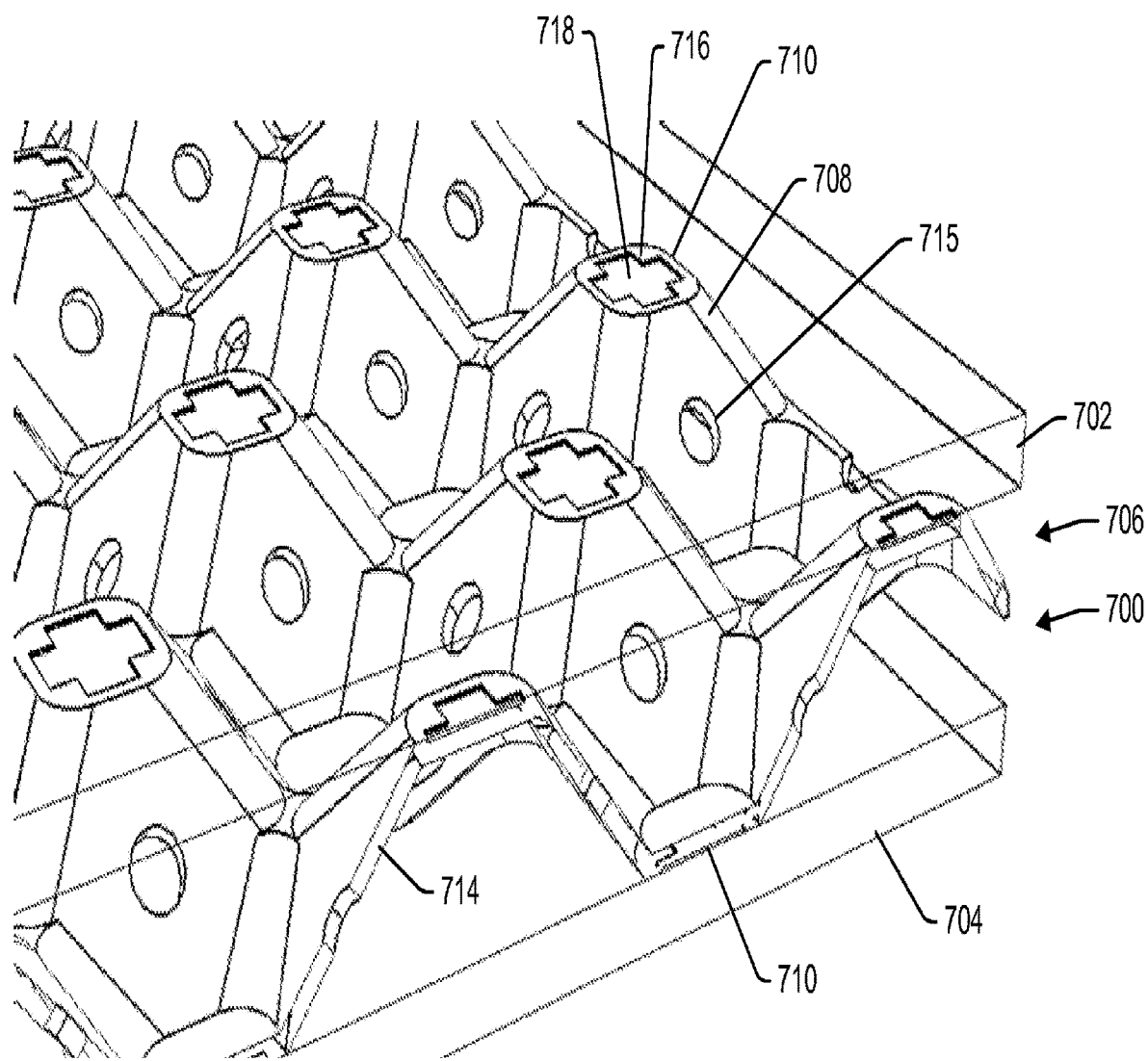
FIG. 7 schematically depicts a sectional perspective view of a spacer assembly in accordance with one or more embodiments of the disclosure.

FIG. 7 depicts a sectional perspective view of a spacer assembly 700 in accordance with one or more embodiments of the disclosure. The spacer assembly 700 may be positioned between a first sheet 702 and a second sheet 704. The first sheet 702 and the second sheet 704 may oppose (or face) each other so as to form a cavity 706 therebetween. The first sheet 702 and/or the second sheet 704 may initially be convex or substantially flat. The spacer assembly 700 may be disposed within the cavity 706 formed between the two opposing sheets. In some instances, the spacer assembly 700 may be at least partially transparent. The spacer assembly 700 may be disposed at any location within the cavity 706. In some instances, a vacuum may be applied to the cavity 706.

In certain embodiments, the spacer assembly 700 may include a sheet of interconnected spacers. For example, the spacer assembly 700 may include a number of alternating and opposing pyramid-like structures 708. That is, some pyramid structures 708 may extend and narrow towards the first sheet 702, while other pyramid structures may extend and narrow towards the second sheet 704. In some instances, the pyramid structures 708 may be frustums, such as square frustums or the like. In one embodiment, the sheet of pyramid structures 708 may resemble an egg carton. Each of the pyramid structures 708 may form contact points 710. The contact points 710 may contact the first sheet 702 or the second sheet 704 depending on the orientation of the pyramid structure 708. An angled wall 714 may connect adjacent contact points 710 to form the pyramid structures 708. That is, the pyramid structures 708 may include a number of angled walls 714. In some instances, the angled wall 714 may include at least one hole 715. The at least one hole 715 may enable the passage of air between the alternating pyramid structures 708. For example, if a vacuum is applied to the cavity 706, the holes 715 may enable air to travel throughout the cavity 706.

In some instances, a top portion 716 of the pyramid structures 708 may be configured to minimize the contact area between the first sheet 702 or the second sheet 704. For example, the top portion 716 may include a recessed portion 718. In some instances, only the edge of the top portion 716 may contact the first sheet 702 or the second sheet 704 when a vacuum is applied to the cavity 706. In this manner, the pathway created by the spacer assembly 700 for heat to travel between the first sheet 702 and the second sheet 704 may be minimized.

The pyramid structures 708 may have any size, shape, or configuration. Any number of the pyramid structures 708 may be used herein. Other components and other configurations may be used herein. The spacer assembly 700 may combine the pyramid structures 708 with other types of spacers. The pyramid structures 708 may be positioned continuously or intermittently across the sheets.

A cooler assembly including a screen in also disclosed herein. In some instances, the screen may be configured to provide a heat transfer barrier and/or obstruction. That is, the screen may be configured to prevent and/or substantially reduce heat transfer between the cooler assembly and the surrounding environment. For example, in some instances, the screen may be positioned between an interior portion of the cooler assembly and a door of the cooler assembly. In this manner, the screen may form a layer of separation air between the screen and the door, thereby preventing and/or substantially reducing heat transfer through the door to the surrounding environment. Other technical advantages may become apparent throughout the disclosure.

In certain embodiments, the cooler assembly may include a temperature controlled area, such as the interior of the cooler assembly. In some instances, the cooler assembly may be a beverage cooler located in a retail setting, such as a convenience store, a grocery store, or the like. Other types of cooler assemblies may also be used herein, including a table top cooler assembly, a walk-in cooler assembly, a free standing cooler assembly, an integral cooler assembly, a modular cooler assembly, or the like. Moreover, other types of items may be stored within the cooler assembly, including perishable items, products, promotional items, or the like. Any item where a temperature controlled setting is desirable may be stored within the cooler assembly. In addition, heating elements may be used herein. That is, the cooler assembly may heat and/or cool items therein.

The cooler assembly also may include a door configured to provide access to the temperature controlled area. In this manner, the door may be configured to be opened and closed. For example, the door may be a hinged door or a sliding door, although other types and styles of doors may be used herein. In certain embodiments, the door may be a glass door, a plastic door, a polymer door (such as polycarbonate), a combination thereof, or the like. Any transparent materials or otherwise may be used to construct the door. In this manner, the door may be at least partially transparent so that a customer can see the contents of the temperature controlled area within the cooler assembly when the door is closed. In some instances, the door may include a handle or the like. A customer may open the door and remove the contents from the temperature controlled area of the cooler assembly, after which the user may close the door.

In certain embodiments, the cooler assembly may include a screen. The screen may include a stowed configuration and an unstowed (or extended) configuration. For example, when in the unstowed configuration, the screen may be at least partially positioned between the temperature controlled area and the door. In some instances, the unstowed screen may be substantially the same size and the same shape as the door. In certain embodiments, the unstowed screen may form a layer of separation air between the screen and the door, thereby substantially reducing heat transfer through the door to the surrounding environment. Alternatively, or in addition to the layer of separation air, the unstowed screen itself may provide a layer of insulation between the temperature controlled area and the door. The screen may be formed of any suitable material that is configured to provide a heat transfer barrier and/or obstruction.

As noted above, the screen may be stowed. For example, the screen may be rolled up and/or folded. That is, the screen may be stowed as a roll, as series of folds, or a combination thereof. In some instances, the screen may be rolled and thereafter folded, or the screen may be folded and thereafter rolled. The folds may include vertical folds and/or horizontal folds. Other stowed arrangements are also possible. In some instances, the screen may be stowed about a top portion of the temperature controlled area and/or the door, although the screen may be stowed in other locations about the cooler assembly. For example, the screen may be attached to the temperature controlled area, the door, or a combination thereof when in the stowed configuration or the unstowed configuration. Moreover, in certain embodiments, the screen may be removed and stowed remotely from the cooler assembly. That is, the screen may be removable.

In some instances, the screen may be substantially transparent. In other instances, the screen may be substantially opaque. In certain embodiments, the screen may include indicia thereon (such as advertising or the like) capable of being seen through the door when the screen is in the unstowed configuration. For example, the screen may include a product trademark or the like, although any writing, message, illustration, or otherwise may be disposed on the screen.

A user may open the door of the cooler assembly. The user may then position the screen in the unstowed configuration between the temperature controlled area and the door. For example, the user may unroll and/or unfold the stowed screen. In some instances, the user may attach the screen if it is stowed remotely from the cooler assembly. Next, the user may close the door about the temperature controlled area. The unstowed screen may be positioned between the temperature controlled area and the door such that the door forms a generally hermetic seal with the temperature controlled area when closed. The unstowed screen may be configured to provide a heat transfer barrier and/or obstruction, which prevents and/or substantially reduces heat transfer between the cooler assembly and the surrounding environment. Conversely, the user may open the door to the temperature controlled area, fold and/or roll the screen into the stowed configuration, and thereafter stow the screen.

These and other embodiments of the disclosure will be described in more detail through reference to the accompanying drawings in the detailed description that follows. This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Figure 8:
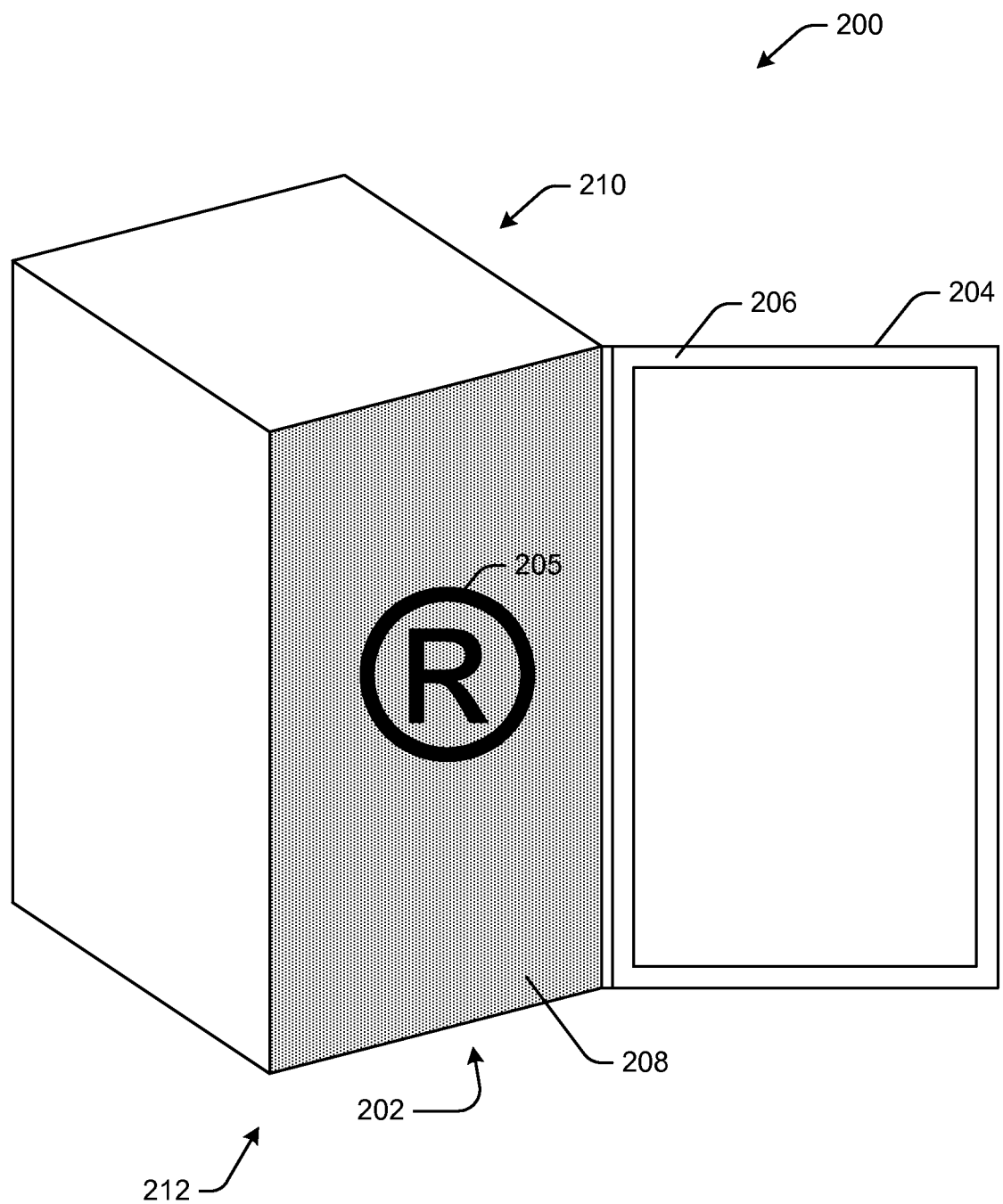
FIG. 8 schematically depicts a perspective view of a cooler assembly in accordance with one or more embodiments of the disclosure.

FIGS. 8-17 schematically depict one or more example systems and methods for a cooler assembly including a screen in accordance with one or more embodiments of the disclosure. Specifically, FIG. 8 schematically depicts an example embodiment of a cooler assembly 200 as may be used herein. In certain embodiments, the cooler assembly 200 may include a temperature controlled area 202, such as the interior of the cooler assembly 200. In some instances, the cooler assembly 200 may be a beverage cooler located in a retail setting, such as a convenience store, a grocery store, or the like. Other types of cooler assemblies may also be used herein, including a table top cooler assembly, a walk-in cooler assembly, a free standing cooler assembly, an integral cooler assembly, a modular cooler assembly, or the like. Moreover, other types of items may be stored within the cooler assembly 200, including perishable items, products, promotional items, or the like. Any item where a temperature controlled setting is desirable may be stored within the cooler assembly 200. In addition, heating elements may be used herein. That is, the cooler assembly 200 may heat and/or cool items therein.

The cooler assembly 200 also may include a door 204 configured to provide access to the temperature controlled area 202. In this manner, the door 204 may be configured to be opened and closed. As depicted in FIG. 8, the door 204 is open. The door 204 may be a hinged door or a sliding door, although other types and styles of doors may be used herein. In certain embodiments, the door 204 may be a glass door, a plastic door, a polymer door (such as polycarbonate), a combination thereof, or the like. Any transparent materials or otherwise may be used to construct the door 204. In this manner, the door 204 may be at least partially transparent so that a customer can see the contents of the temperature controlled area 202 within the cooler assembly 200 when the door 204 is closed. In some instances, the door 204 may include a handle or the like. A customer may open the door 204 and remove the contents from the temperature controlled area 202 of the cooler assembly, after which the user may close the door 204. The door 204 may form a heretic seal with the temperature controlled area 202 when closed. For example, one or more seals 206 may be disposed about a periphery of the door 204 and/or the temperature controlled area 202. In some instances, the door 204 may include a number of panels attached to a frame. The door 204 also may include an access port or the like for accessing the contents of the temperature controlled area 202 within the cooler assembly 200.

The cooler assembly 200 may include a screen 208. In some instances, the screen 208 may be positioned between the temperature controlled area 202 and the door 204. As depicted in FIG. 8, the screen 208 is in the unstowed (or extended) configuration. For example, the screen 208 may extend from an upper portion 210 of the cooler assembly 200 to a lower portion 212 of the cooler assembly 200 or vise versa. In certain embodiments, the screen 208 may be substantially the same size and the same shape as the door 204 and/or an opening to the temperature controlled area 202. The screen 208 may form a heat transfer barrier and/or obstruction between the temperature controlled area 202 and the door 204 when closed. The screen 208 may be any suitable material. In certain embodiments, the screen 208 may include indicia 205 thereon (such as advertising or the like) capable of being seen through the door 204 when the screen 208 is in the unstowed configuration. For example, the screen 208 may include a product trademark or the like, although any writing, message, illustration, or otherwise may be disposed on the screen 208. In some instances, the screen 208 may be opaque or transparent. In an embodiment, the screen 208 may include electronics, such as a flexible LED screen or the like, for conveying advertisements to the consumers.

Figure 9:
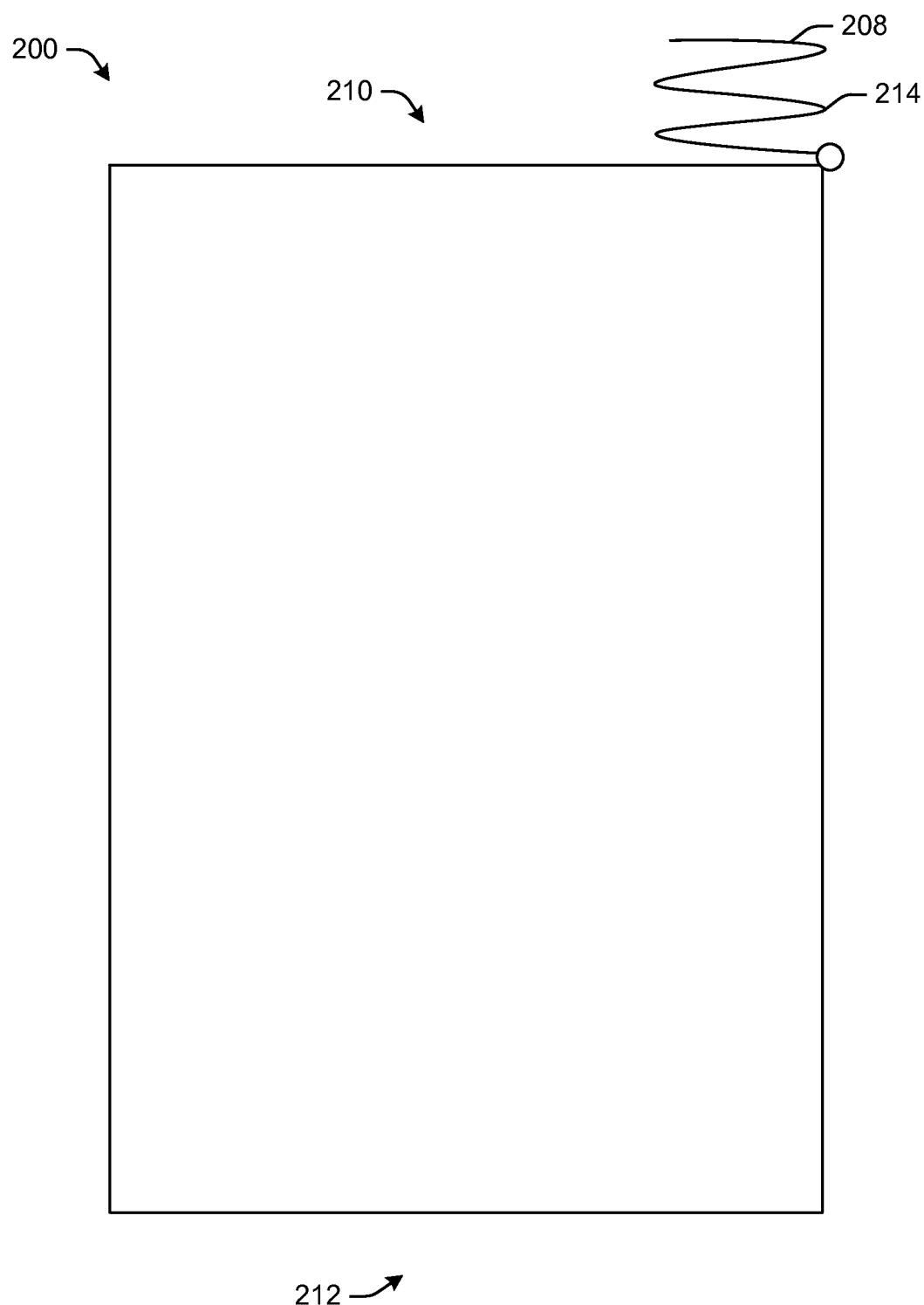
FIG. 9 schematically depicts a side view of a cooler assembly in accordance with one or more embodiments of the disclosure.

FIG. 9 schematically depicts an example embodiment of the screen 208 in the stowed configuration. For example, the screen 208 may be folded up and positioned about the upper portion 210 of the cooler assembly 200. In this manner, the screen 208 may include a series of horizontal folds 214. In some instances, the screen 208 may include one or more vertical folds in addition to the horizontal folds 214. In some instances, the screen 208 may be attached to the upper portion 210 of the cooler assembly 200. For example, the screen 208 may be permanently or temporarily attached by way of a hinge, a screw, a joint, a pivot, a hook-and-loop, etc. Any means may be used to attach the screen 208 to the cooler assembly 200. Further, the screen 208 may be attached at any location about the cooler assembly 200, including the upper portion 210, the bottom portion 212, the sides, the door 204, or the interior of the cooler assembly 200, etc. In some instances, the screen 208 may be stored about the upper portion 210 of the cooler assembly 200 when in the stowed configuration.

Figure 10:
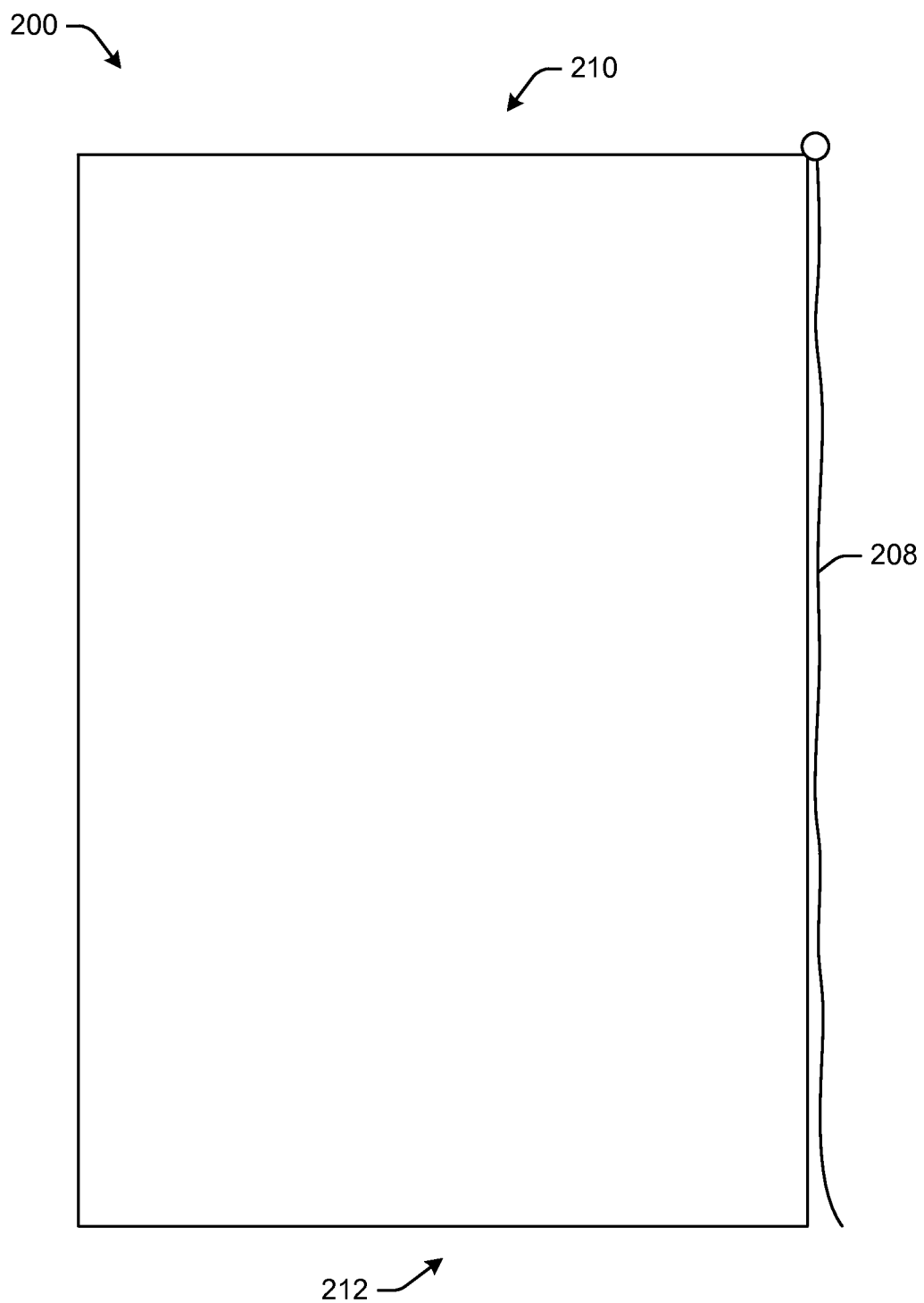
FIG. 10 schematically depicts a side view of a cooler assembly in accordance with one or more embodiments of the disclosure.

FIG. 10 schematically depicts an example embodiment of the screen 208 of FIG. 9 in the unstowed (or extended) configuration. For example, the screen 208 may be unfolded from the upper portion 210 of the cooler assembly 200. In some instances, gravity may maintain the screen 208 in the unstowed configuration.

Figure 11:
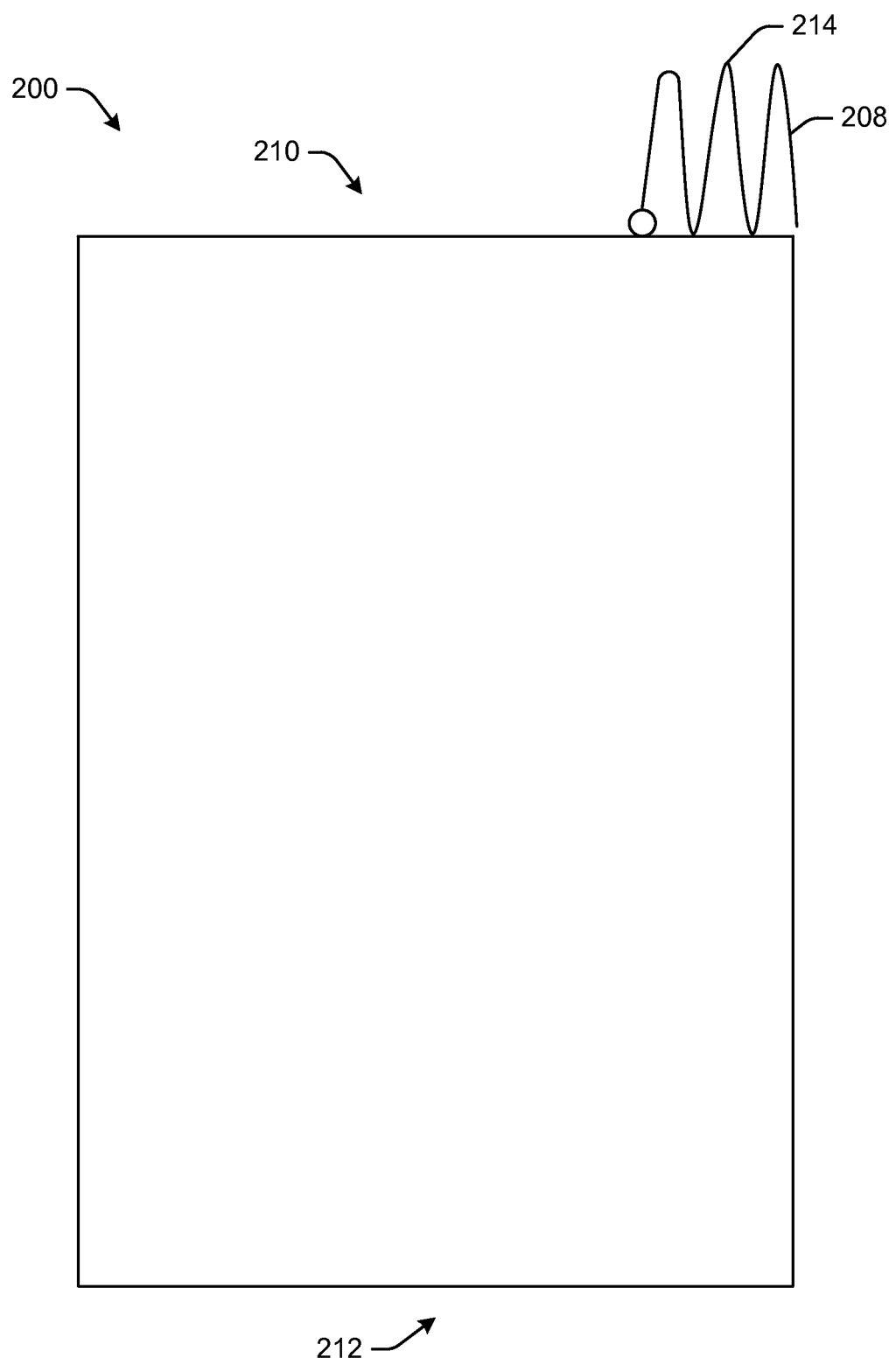
FIG. 11 schematically depicts a side view of a cooler assembly in accordance with one or more embodiments of the disclosure.

FIG. 11 schematically depicts an example embodiment of the screen 208 in the stowed configuration. For example, the screen 208 may be coupled to a track or other type of device that maintains the screen in the stowed configuration (e.g., folded up and positioned about the upper portion 210 of the cooler assembly 200) or the unstowed configuration. The screen 208 may include a series of horizontal folds 214 and/or vertical folds. In some instances, in order to move the screen 208 from the stowed configuration to the unstowed configuration, a user may pull the screen 208 down from the upper portion 210 of the cooler assembly. In other instances, a mechanical crank or the like may be associated with the screen 208. In this manner, the user may move the screen 208 between the stowed and unstowed configuration by manipulating the crank. In yet other instances, an electromechanical system may be associated with the screen 208. For example, the electromechanical system may automatically deploy and/or retract the screen 208 at a given time. In some instances, proximity sensors or the like may be associated with the electromechanical system such that the screen 208 may automatically be deployed if a consumer is nearby and/or retracted if a consumer is not detected for a given time.

Figure 12:
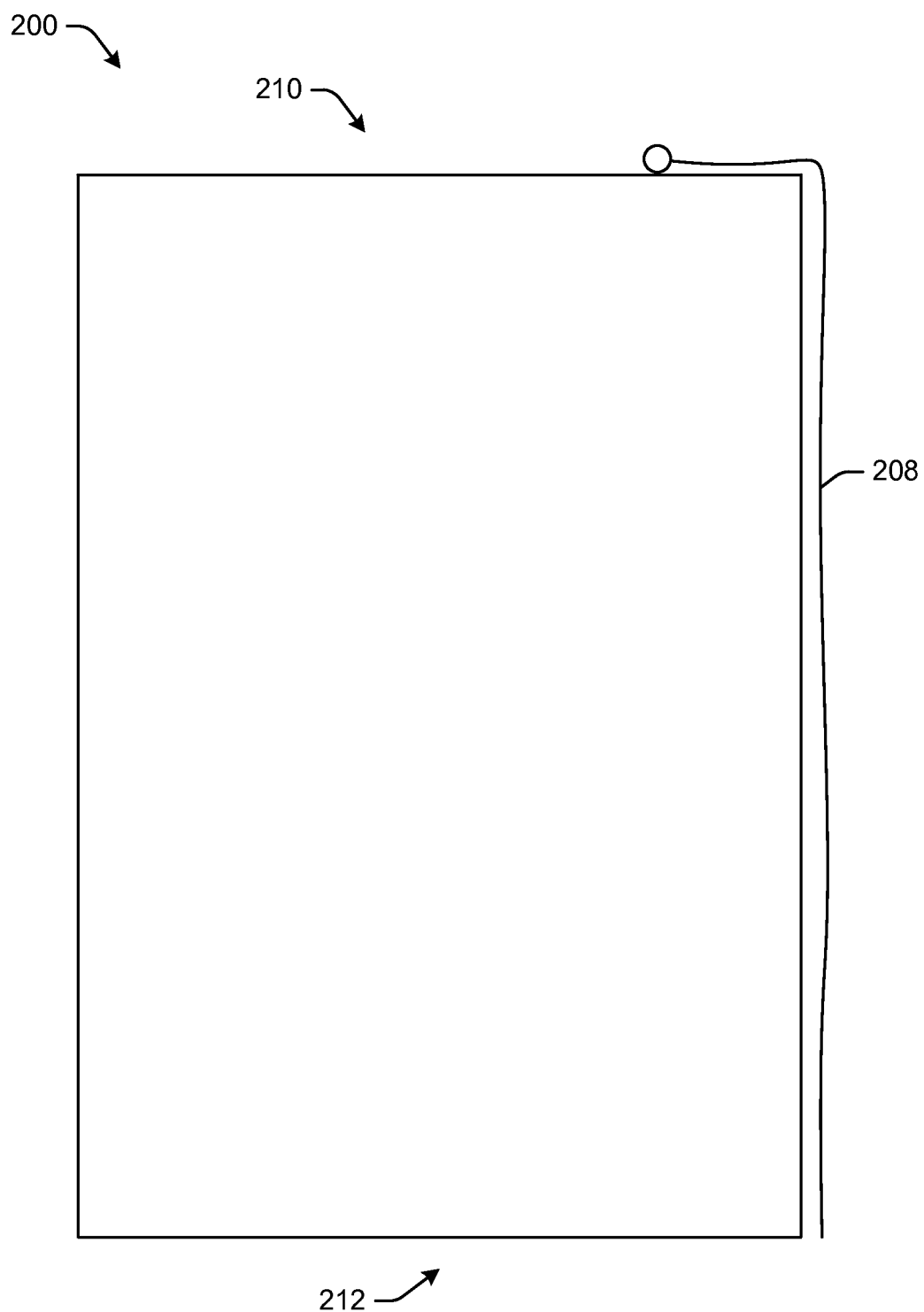
FIG. 12 schematically depicts a side view of a cooler assembly in accordance with one or more embodiments of the disclosure.

FIG. 12 schematically depicts an example embodiment of the screen 208 of FIG. 11 in the unstowed (or extended) configuration. For example, the user may pull the screen 208 from the upper portion 210 to the lower portion 212 of the cooler assembly 200, thereby unfolding the screen 208 along the track or the like. The screen 208 may be attached to a hook or other device for maintaining the screen 208 in the unstowed configuration. Any device may be used to maintain the screen 208 in the unstowed configuration. Moreover, in some instances, the screen 208 may be pulled across (i.e., side-to-side) the cooler assembly 200. The screen 208 also may be deployed and/or retracted by use of the crank and/or electromechanical system discussed above.

Figure 13:
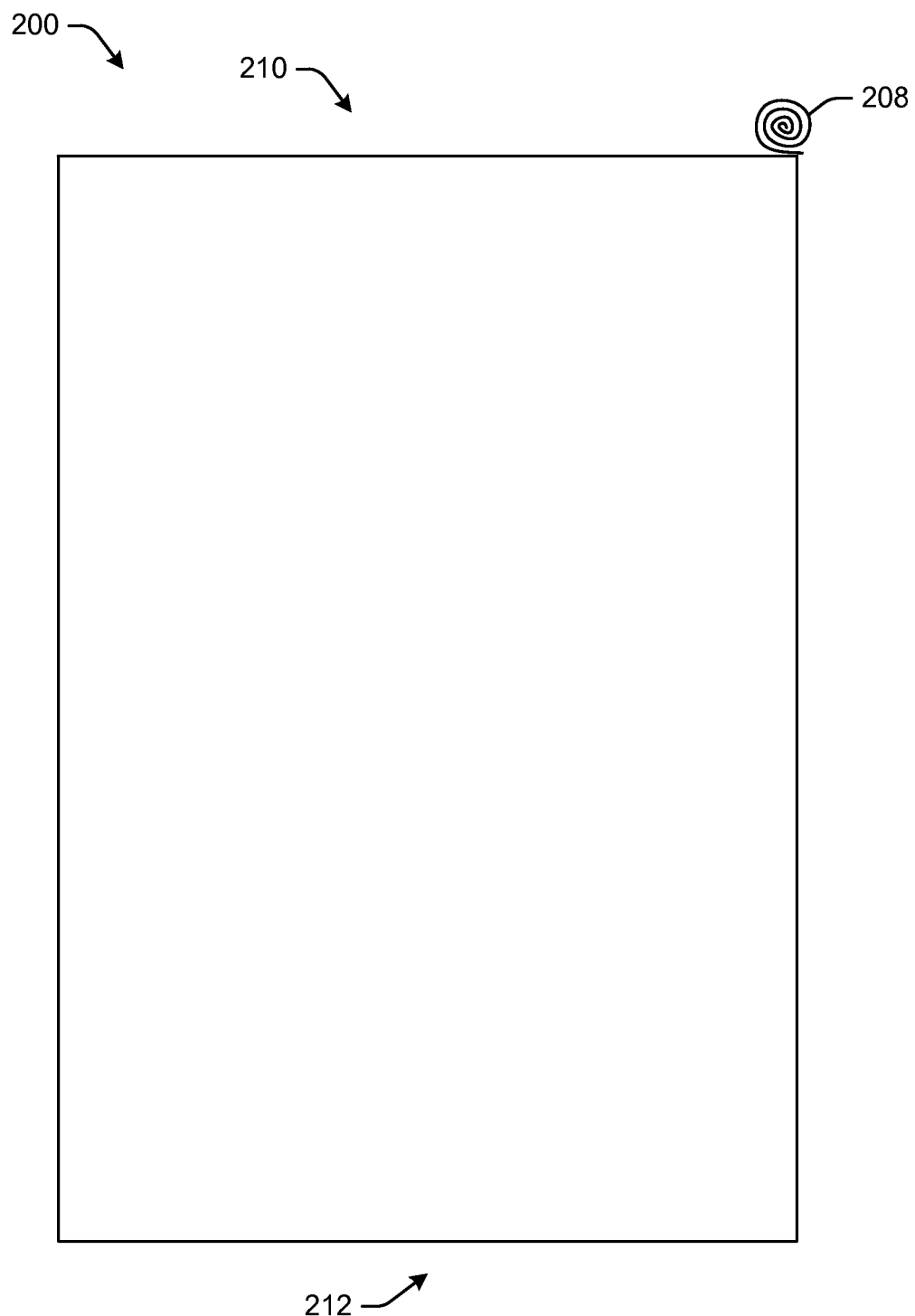
FIG. 13 schematically depicts a side view of a cooler assembly in accordance with one or more embodiments of the disclosure.
Figure 14:
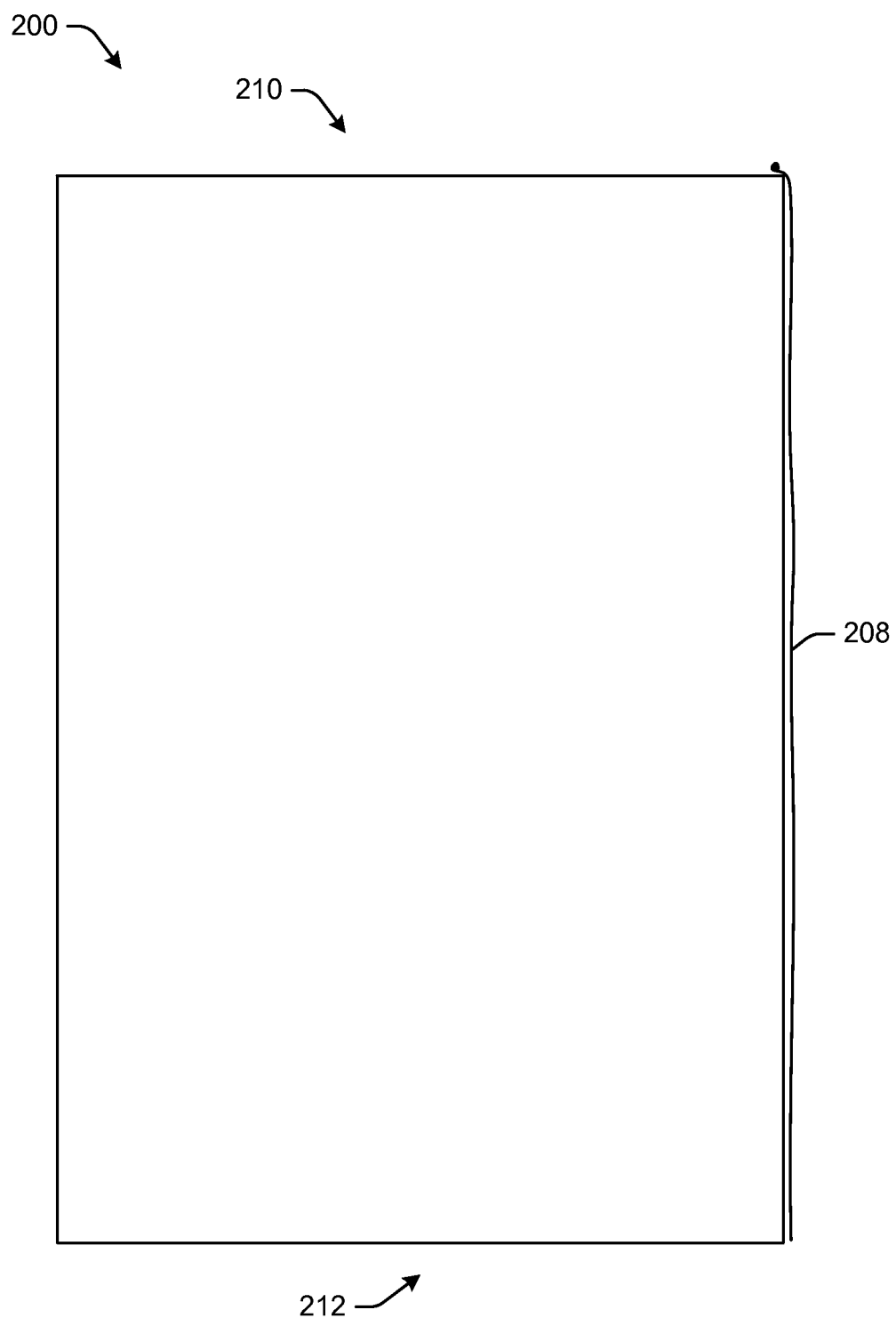
FIG. 14 schematically depicts a side view of a cooler assembly in accordance with one or more embodiments of the disclosure.

FIG. 13 schematically depicts an example embodiment of the screen 208 in the stowed configuration. For example, the screen 208 may be rolled up and positioned about the upper portion 210 of the cooler assembly 200. In some instances, in order to move the screen 208 from the stowed configuration to the unstowed configuration, a user may pull the screen 208 down from the upper portion 210 of the cooler assembly. FIG. 14 schematically depicts an example embodiment of the screen 208 of FIG. 13 in the unstowed (or extended/unrolled) configuration. For example, the user may pull the screen 208 from the upper portion 210 to the lower portion 212 of the cooler assembly 200, thereby unrolling the screen 208. The screen 208 may be attached to a hook or other device for maintaining the screen 208 in the unstowed configuration. Any device may be used to maintain the screen 208 in the unstowed configuration. Moreover, in some instances, the screen 208 may be unrolled across (i.e., side-to-side) the cooler assembly 200. The screen 208 also may be deployed and/or refracted by use of the crank and/or electromechanical system discussed above.

Figure 15:
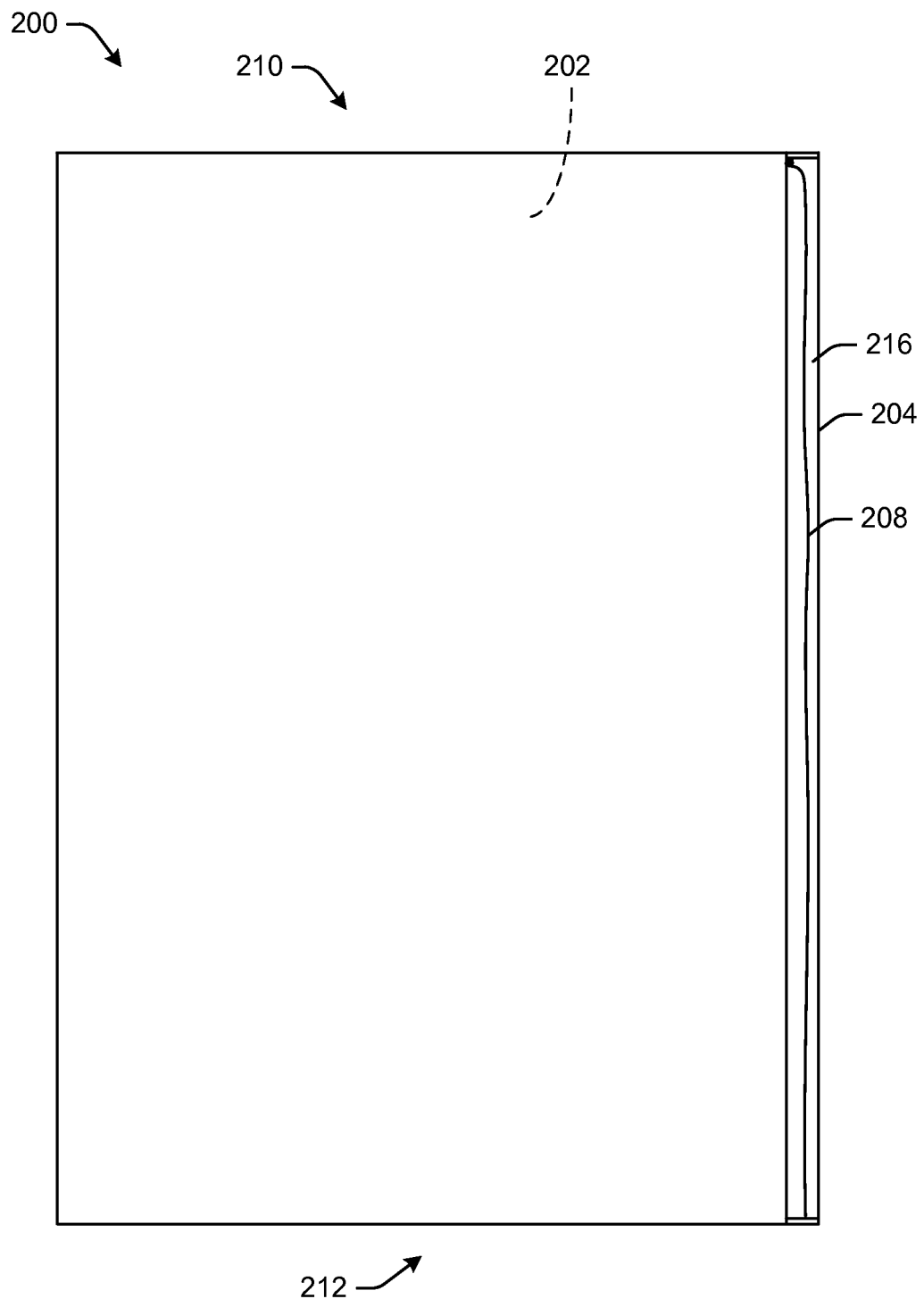
FIG. 15 schematically depicts a side view of a cooler assembly in accordance with one or more embodiments of the disclosure.

FIG. 15 schematically depicts an example embodiment of the screen 208 in the unstowed configuration. In certain embodiments, the unstowed screen 208 may form a layer of separation air 216 between the screen 208 and the door 204. The separation air 216 may substantially reduce heat transfer through the door 204 to the surrounding environment. Alternatively, or in addition to the layer of separation air 216, the unstowed screen 208 itself may provide a layer of insulation between the temperature controlled area 202 and the door 204. In this manner, the screen 208 may be any suitable material. In some instances, multiple screens 208 may be used to create multiple barriers.

Figure 16:
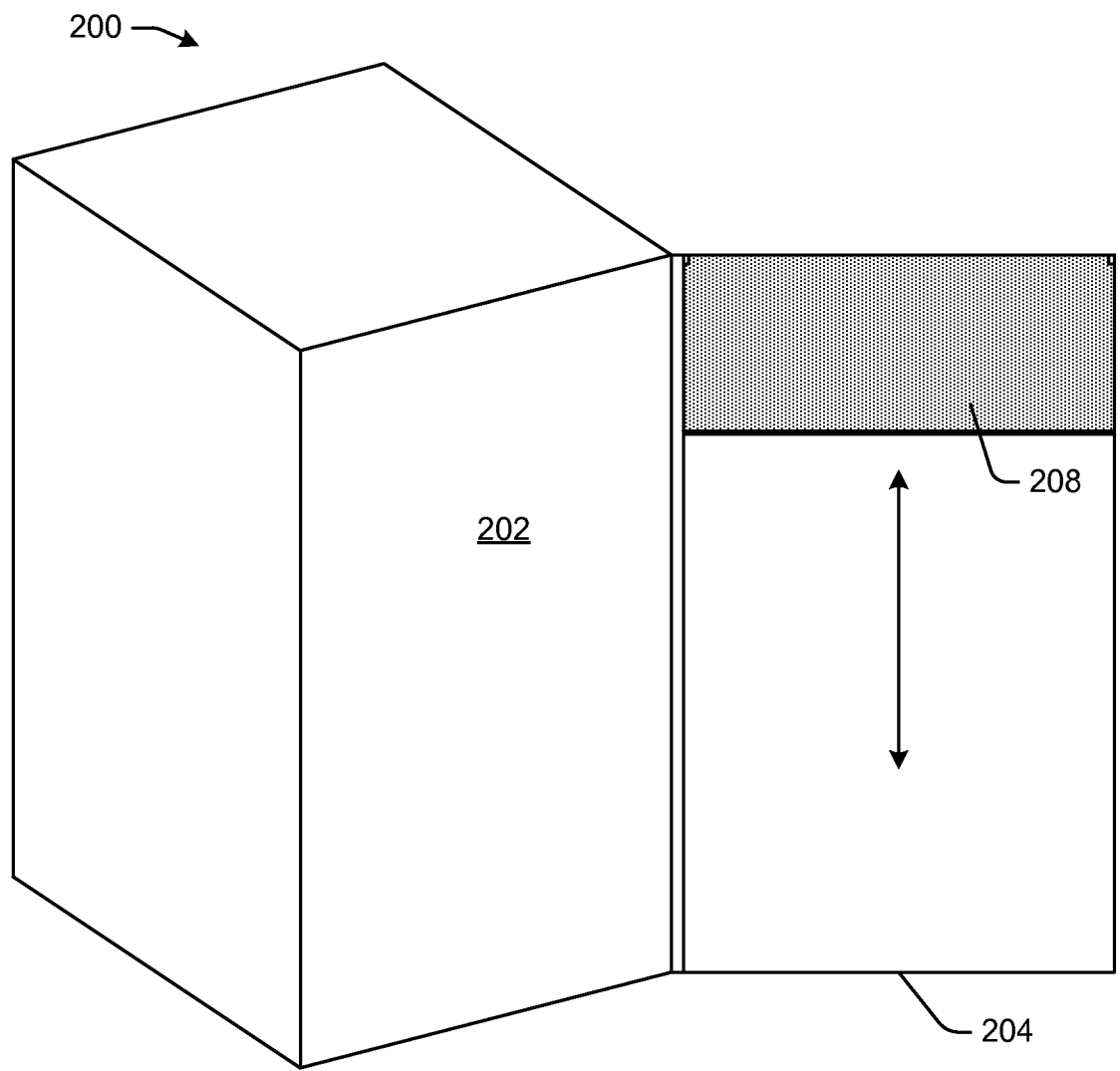
FIG. 16 schematically depicts a perspective view of a cooler assembly in accordance with one or more embodiments of the disclosure.

FIG. 16 schematically depicts an example embodiment of the cooler assembly 200. The screen 208 may be attached at any location about the cooler assembly 200. For example, the screen 208 may be attached to the door 204. In other instances, the screen 208 may be attached inside the temperature controlled area 202. Moreover, in certain embodiments, the screen 208 may be removable. That is, the screen 208 may be removed and stowed remotely from the cooler assembly 200. In some instances, the screen 208 may be attached one the outside portion of the door 204.

A user may open the door 204 of the cooler assembly 200. The user may then position the screen 208 in the unstowed configuration (e.g., as depicted in FIG. 15) between the temperature controlled area 202 and the door 204. For example, the user may unroll (e.g., as depicted in FIG. 14) and/or unfold (e.g., as depicted in FIGS. 10 and 12) the stowed screen 208. In some instances, the user may attach the screen 208 to the cooler assembly 200 if the screen 208 is stowed remotely from the cooler assembly 200. Next, the user may close the door 204 about the temperature controlled area 202. In this manner, the unstowed screen 208 may be at least partially positioned between the temperature controlled area 202 and the door 204. The unstowed screen 208 may form a layer of separation air 216 between the screen 208 and the door 204. The separation air 216 may substantially reduce heat transfer through the door 204 to the surrounding environment. Moreover, in some instances, the unstowed screen 208 itself may provide a layer of insulation between the temperature controlled area 202 and the door 204. The unstowed screen 208 may be configured to provide a heat transfer barrier and/or obstruction, which prevents and/or substantially reduces heat transfer between the cooler assembly 200 and the surrounding environment.

In some instances, the user may remove the screen 208 from between the temperature controlled area 202 and the door 204 by rolling it up, folding it, and/or detaching it from the cooler assembly 200. The screen 208 may be stowed at any location about the cooler assembly 200 or remotely thereof.

Figure 17:
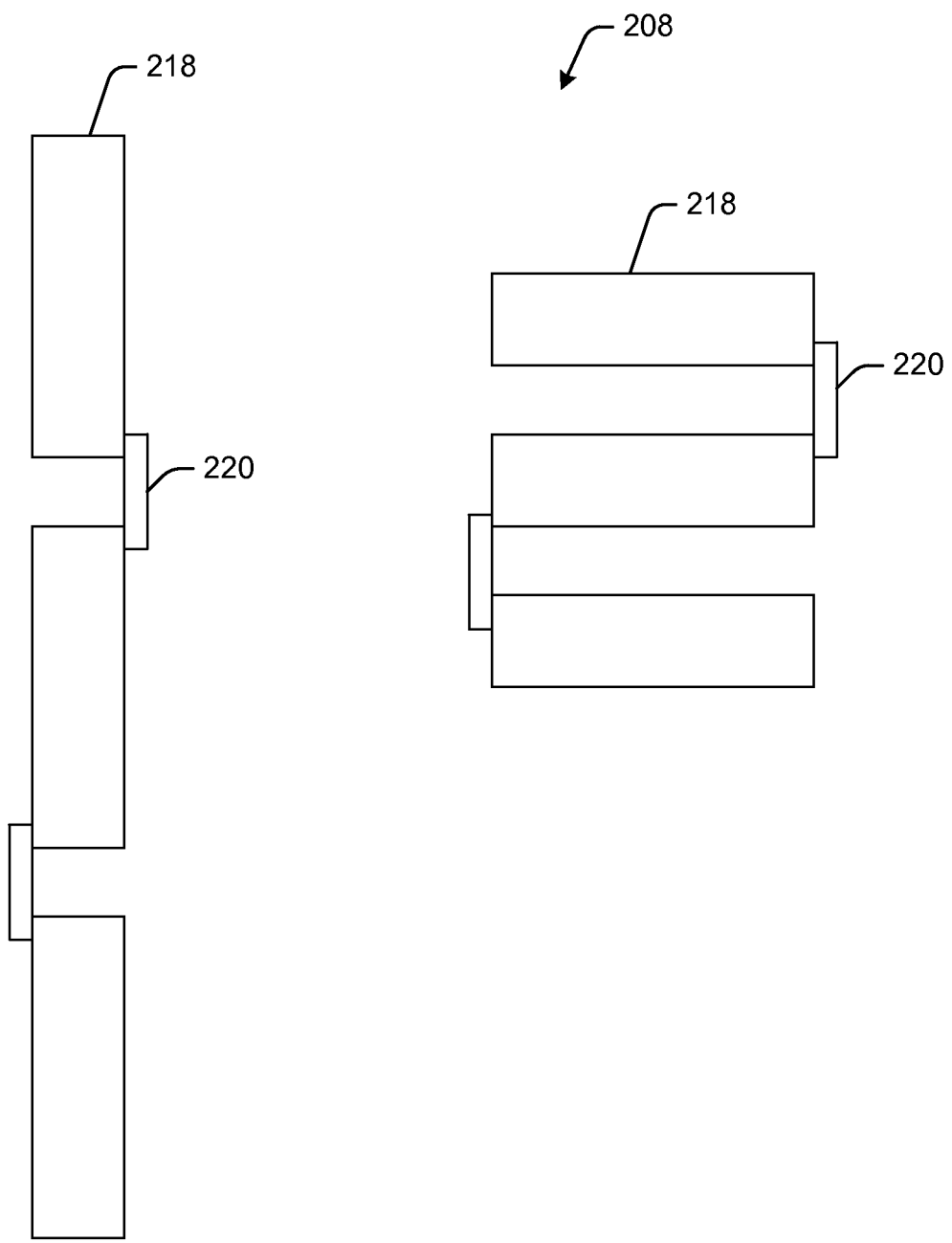
FIG. 17 schematically depicts a side view of the screen in accordance with one or more embodiments of the disclosure.

FIG. 17 schematically depicts an example embodiment of the screen 208. In certain embodiments, the screen 208 may be made of rigid materials. For example, the screen 208 may be made of one or more boards 218. The boards 218 may be foam boards, recycled PET boards or other insulating boards. Any type of substantially rigid insulating board may be used herein. The boards 218 may be divided into multiple vertically and/or horizontally divided segments that may be alternately hinged together by way of one or more hinges 220 to promote folding and stacking of the screen 208. For example, the boards 218 may be hinged together using a sheet of paper or other flexible material glued or otherwise affixed to each segment of the boards 218 in an alternating patter.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for assembling a vacuum insulated panel, the method comprising:
   positioning a first pre-formed convex sheet about a first side of a frame;
   positioning a second pre-formed convex sheet positioned about a second side of the frame;
   forming a cavity between the first pre-formed convex sheet and the second pre-formed convex sheet;
   forming a vacuum within the cavity between the first pre-formed convex sheet and the second pre-formed convex sheet; and
   flattening, at least partially, the first pre-formed convex sheet and the second pre-formed convex sheet into a substantially parallel planar configuration.

2. The method of claim 1, further comprising forming a hermetic seal about the cavity.

3. The method of claim 1, further comprising positioning at least one access port on at least one of the frame, the first convex sheet, the second convex sheet, or a combination thereof.

4. The method of claim 3, further comprising providing a pump in communication with the at least one access port, wherein the pump is configured to create the vacuum within the cavity.

5. The method claim 1, further comprising positioning at least one spacer within the cavity between the first pre-formed convex sheet and the second pre-formed convex sheet.

6. The method of claim 1, wherein the first pre-formed convex sheet comprises at least one of a glass sheet, a plastic sheet, or a combination thereof.

7. The method of claim 1, wherein the second pre-formed convex sheet comprises at least one of a glass sheet, a plastic sheet, or a combination thereof.

8. The method of claim 1, wherein the vacuum insulated panel comprises a door of a cooler assembly.

9. The method of claim 8, wherein the door is at least partially transparent.

10. The method of claim 5, wherein the at least one spacer comprises at least one rounded side in contact with the first convex sheet or the second convex sheet to minimize a contact point between the first convex sheet or the second convex sheet.

11. The method of claim 5, wherein the at least one spacer comprises a spacer assembly comprising one or more sheets of alternating pyramid structures.

\* \* \* \* \*